United States Patent
Gormanns et al.

(10) Patent No.: US 11,794,203 B2
(45) Date of Patent: Oct. 24, 2023

(54) ATTACHMENT ELEMENT FOR A STATIC MIXER AND ATTACHMENT SYSTEM THEREWITH

(71) Applicant: AUDI AG, Ingolstadt (DE)

(72) Inventors: Marc Gormanns, Erlenbach (DE); Erich Lehner, Bad Friedrichshall (DE)

(73) Assignee: AUDI AG, Ingolstadt (DE)

( * ) Notice: Subject to any disclaimer, the term of this patent is extended or adjusted under 35 U.S.C. 154(b) by 431 days.

(21) Appl. No.: 16/953,823

(22) Filed: Nov. 20, 2020

(65) Prior Publication Data

US 2021/0162442 A1 Jun. 3, 2021

(30) Foreign Application Priority Data

Nov. 28, 2019 (DE) .......................... 102019132395.9

(51) Int. Cl.
 *B05B 12/00* (2018.01)
 *B05B 12/02* (2006.01)
 (Continued)

(52) U.S. Cl.
 CPC .......... *B05B 12/008* (2013.01); *B01F 35/754* (2022.01); *B05B 12/02* (2013.01);
 (Continued)

(58) Field of Classification Search
 CPC ....... B05B 12/008; B05B 12/02; B05B 15/14; B05B 12/085; B05B 13/0627;
 (Continued)

(56) References Cited

U.S. PATENT DOCUMENTS 5,271,521 A * 12/1993 Noss ................. B01F 25/43141
 222/146.2
6,629,774 B1 10/2003 Gruendeman
 (Continued)

FOREIGN PATENT DOCUMENTS

CN 1030881 A 2/1989
CN 101829512 A 9/2010
 (Continued)

OTHER PUBLICATIONS

Search Report dated Jun. 12, 2020 in corresponding German Application No. 10 2019 132 395.9; 12 pages, Machine translation attached.
Office Action dated May 31, 2022, in corresponding Chinese Application No. 202011346167.5; 10 pages including English-language translation.

*Primary Examiner* — Frederick C Nicolas
(74) *Attorney, Agent, or Firm* — Maier & Maier, PLLC

(57) ABSTRACT

An attachment element for a static mixer and an attachment system with such an attachment element, the static mixer, and a pressure sensor. The attachment element has a flow channel with an inlet opening and an outlet opening arranged opposite the inlet opening in a longitudinal direction of the flow channel and designed as an injection nozzle. The attachment element is designed to be fastened at an inlet side having the inlet opening by a fastening unit of the attachment element on top of an injection tip of the static mixer. Furthermore, the attachment element has a receiving opening for the pressure sensor. The receiving opening extends from an exterior side of the attachment element to an opening in a subsection of a channel wall of the flow channel.

11 Claims, 1 Drawing Sheet

(51) Int. Cl.
| | |
|---|---|
| *H01M 10/653* | (2014.01) |
| *B05B 15/14* | (2018.01) |
| *B01F 35/75* | (2022.01) |
| *B05C 11/10* | (2006.01) |
| *B05B 12/08* | (2006.01) |
| *B05B 13/06* | (2006.01) |
| *H01M 10/625* | (2014.01) |
| *B01F 101/36* | (2022.01) |
| *B01F 25/42* | (2022.01) |
| *H01M 50/249* | (2021.01) |
| *H01M 10/6556* | (2014.01) |
| *B01F 35/21* | (2022.01) |

(52) U.S. Cl.
CPC ........ *B05B 12/085* (2013.01); *B05B 13/0627* (2013.01); *B05B 15/14* (2018.02); *B05C 11/1013* (2013.01); *H01M 10/653* (2015.04); *B01F 25/42* (2022.01); *B01F 35/2113* (2022.01); *B01F 2101/36* (2022.01); *H01M 10/625* (2015.04); *H01M 10/6556* (2015.04); *H01M 50/249* (2021.01); *H01M 2220/20* (2013.01); *Y02E 60/10* (2013.01)

(58) Field of Classification Search
CPC .... B01F 35/754; B01F 2101/36; B01F 25/42; B01F 35/2113; B05C 11/1013; H01M 10/653; H01M 10/625; H01M 2220/20; H01M 10/6556; H01M 50/249; Y02E 60/10
See application file for complete search history.

(56) References Cited

U.S. PATENT DOCUMENTS

| | | | |
|---|---|---|---|
| 6,913,166 B2 * | 7/2005 | Cline | B29B 7/748 |
| | | | 222/138 |
| 11,154,829 B2 * | 10/2021 | Pfeiler | B01F 25/43 |
| 2003/0185098 A1 | 10/2003 | Koch et al. | |
| 2005/0127201 A1 | 6/2005 | Matsumoto | |
| 2005/0161525 A1 | 7/2005 | Johansson | |
| 2008/0011872 A1 | 1/2008 | Charpie | |
| 2008/0029615 A1 | 2/2008 | Davies et al. | |
| 2013/0092284 A1 * | 4/2013 | Holland | F16N 35/00 |
| | | | 222/251 |
| 2014/0084075 A1 | 3/2014 | Vandelli et al. | |
| 2015/0109144 A1 | 4/2015 | Khoury et al. | |
| 2019/0105621 A1 * | 4/2019 | Pfeiler | B05C 5/0225 |

FOREIGN PATENT DOCUMENTS

| | | |
|---|---|---|
| CN | 102490376 A | 6/2012 |
| CN | 102553747 A | 7/2012 |
| CN | 102639343 A | 8/2012 |
| CN | 202412709 U | 9/2012 |
| CN | 103579713 A | 2/2014 |
| CN | 109551788 A | 4/2019 |
| DE | 1936472 A1 | 2/1971 |
| DE | 19516753 A1 | 11/1996 |
| DE | 29905530 U1 | 8/1999 |
| DE | 102009014933 A1 | 10/2010 |
| DE | 102018208070 A1 | 11/2019 |

* cited by examiner

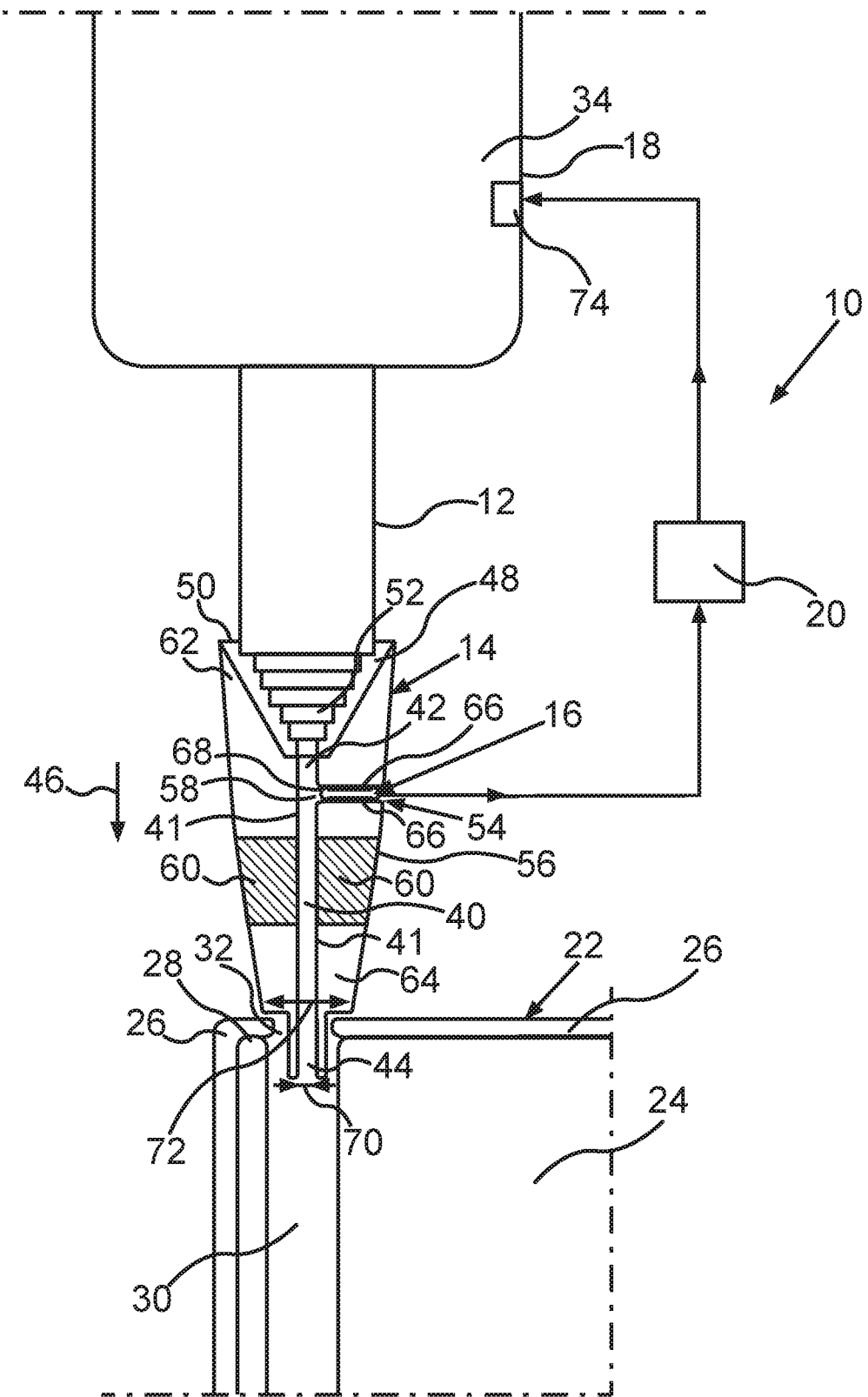

US 11,794,203 B2

ATTACHMENT ELEMENT FOR A STATIC MIXER AND ATTACHMENT SYSTEM THEREWITH

FIELD

The invention relates to an attachment element for a static mixer and an attachment system comprising such an attachment element, a static mixer, and a pressure sensor.

BACKGROUND

An electric vehicle or a hybrid vehicle typically has a high-voltage battery. During quick charging of the high-voltage battery and during power draw in the context of a trip with the electric or hybrid vehicle, heat is generated in the high-voltage battery. This heat is typically dissipated with the aid of a cooling element, such as, for instance, a cooling base, which is arranged together with a battery module of the high-voltage battery in a housing of the high-voltage battery. In order to improve heat conduction from the battery module to the cooling element, a thermal paste, which is frequently referred to as a gap filler, is often introduced into a gap between the cooling element and at least one battery cell of the battery module. For this purpose, the thermal paste may, for example, be injected onto the cooling element in a bead-like shape after module installation. Attaching and/or lowering the individual battery cells of the battery module onto the applied thermal paste compresses the paste to form a coherent surface and achieves flat contact between the respective battery cell and the cooling element. Alternatively, the thermal paste may be injected into a gap between the individual battery cells of the battery module and a housing wall of the battery module covered by the cooling element or comprising a cooling element by means of an injection method.

A static mixer is often used to fill the thermal paste into the gap between the at least one battery cell of the battery module and the housing of the battery module with the cooling element arranged thereon or integrated therein. For this purpose, the static mixer is coupled to a filler material reservoir, such as a cartridge, in which the thermal paste is ready for use. The term static mixer is typically used to refer to an apparatus for mixing fluids in which a flow movement in the static mixer causes individual fluids as respective filler materials to be mixed. A static mixer is, however, also used to homogenize, for example, a material with regard to its composition and temperature. In the following, it is assumed that a filler material, such as the thermal paste, is injected by means of such a static mixer from a thermal paste reservoir, referred to herein as the filler material reservoir, into the gap of the battery module described. For this purpose, the housing of the battery module has a corresponding injection opening.

DE 10 2009 014 933 A1 shows a method for tolerance compensation between two components. The components are brought into overlap in portions and a filler compound is injected between the components via at least one bore. After curing the filler compound, the components are connected to one another in the overlapping area. A tool for carrying out such a method has at least one injection nozzle which can be immersed in the bore in a sealing manner. For this purpose, the injection nozzle has a nozzle tip made of a rubber-elastic material, the nozzle tip having a radial taper at its inner circumference.

DE 1 936 472 describes a method of manufacturing a sealed connection between housing parts of an electric accumulator battery. For this purpose, a foamed material is used to seal and connect the housing parts. The starting material for this foamed material is processed by means of an injection molding machine, with a screw injection molding machine or an extruder preferably used for this purpose.

SUMMARY

It is the object of the invention to provide a solution enabling reliable filling of a filler material into a filler material destination.

The invention is based on the understanding that, while injecting a filler material into a filler material destination, such as, for instance, during a gap filler injection method, in the context of which the filler material is injected into a gap between at least one battery cell of a battery module and a housing wall of the battery module covered by a cooling element or comprising a cooling element, a maximum permissible volume flow pressure is specified. It is typically four bars and is a limiting factor for the volumetric flow rate of filler material into the gap. Since, due to joining processes of the cooling element, such as, for instance, a cooling base, and installation tolerance of the individual battery cells of the battery module, a varying height of the gap between an underside of the individual battery cells of the battery module and the cooling base may arise, however, the maximum possible volumetric flow rate of filler material at a certain point in time during injection is variable. In order to be able to optimally utilize a cycle time in the production of battery modules, the volumetric flow rate of the filler material should be high at the beginning of the injection process, that is, at the beginning of an injection of the thermal paste, and lower in comparison at the end of the injection process. The variable to be monitored in this respect is the pressure describing the volume flow. Typically, however, no pressure sensor is built into the battery module itself, such that corresponding pressure values should be sensed in the area of the static mixer involved in the injection process of the filler material. In order to have the lowest possible loss of information, a corresponding pressure sensor should also be arranged as close as possible to the injection opening. The pressure sensor should therefore be arranged in an attachment element for the static mixer. In order to be able to ensure the most reliable filling possible of the filler material destination, for example, the housing of the battery module, with the thermal paste as the filler material, a pressure sensor should consequently be able to be positioned directly on the volume flow of the filler material in a dedicated attachment element for the static mixer.

The attachment element according to the invention is therefore provided for a static mixer. Preferably, it ultimately serves to fill a thermal paste into a gap between at least one battery cell of a battery module and a cooling element, such as a cooling base, arranged on a housing of the battery module or integrated into the housing. The attachment element has a flow channel. The flow channel has an inlet opening and an outlet opening arranged opposite the inlet opening in a longitudinal direction of the flow channel and designed as an injection nozzle. The flow channel is preferably cylindrical in shape, the respective openings of this flow channel being referred to as an inlet opening and an outlet opening. As the outlet opening is designed to be an injection nozzle, the attachment element in the area of the outlet opening is designed to be positioned at an injection opening of the housing of the battery module. Alternatively, the attachment element for the static mixer may also be provided for injecting a filler material into any housing or object, in other words, for filling any filler material destination with a filler material.

Furthermore, the attachment element is designed to be fastened at an inlet side having the inlet opening by means of a fastening unit of the attachment element on top of an injection tip of the static mixer. A static mixer usually has a tip through which the filler material introduced into the static mixer may flow out of the static mixer. This tip typically has a tapered outer circumference, such that the static element can be positioned with the injection tip as a tip in an opening, for example, in the injection opening of the housing of the battery module. The injection tip is introduced into the injection opening as far as possible. The attachment element is now designed to be able to be firmly positioned on top of such an injection tip. For this purpose, the fastening unit may have a thread, for example, such that the attachment element may, with the aid of the thread as the fastening unit, be screwed onto the injection tip of the static mixer, which accordingly also has a thread. The attachment element may, for example, have a recess with the fastening unit in the area of the fastening unit, the recess being shaped, for example, in such a way that a conically designed injection tip may be screwed or plugged into this recess. Ultimately, the fastening unit serves to connect the attachment element to the injection tip of the static mixer in a flow-tight manner, such that a volume flow of the filler material from the injection nozzle of the static mixer to the inlet opening of the attachment element can be implemented under normal operating conditions without the filler material exiting at a location other than the outlet opening of the attachment element.

The attachment element also has a receiving opening for a pressure sensor. The receiving opening extends from an exterior side of the attachment element to an opening in a subsection of a channel wall of the flow channel. The channel wall is an interior side of the flow channel stretching from the inlet opening to the outlet opening of the flow channel. This channel wall has a hole at which the channel wall is open towards the receiving opening. The pressure sensor may thus be introduced into the attachment element from outside the attachment element through the receiving opening up to the subsection of the channel wall and thus be positioned with at least one exterior side of the pressure sensor in the subsection of the channel wall having the opening. The receiving opening is preferably designed to be cylindrical or prismatic and may stretch, for example, perpendicular to the longitudinal direction of the flow channel from the exterior side of the attachment element to the subsection of the channel wall with the opening. If this is the case, the pressure sensor may be positioned in the receiving opening in such a way that a longitudinal extent of the pressure sensor is oriented perpendicular to the longitudinal direction of the flow channel. Alternatively, a receiving opening longitudinal direction of the receiving opening, stretching from the opening in the subsection of the channel wall to the exterior side of the attachment element, may be oriented at an angle between greater than 0 degrees and 90 degrees relative to the longitudinal direction of the flow channel.

A diameter of the receiving opening is proportioned in such a way that the pressure sensor may be positioned in the receiving opening. If the filler material now flows through the flow channel in order to be directed through the attachment element by the static mixer and exit at the outlet opening of the attachment element in the direction of the filler material destination, pressure data describing the volume flow of the filler material may be sensed with the aid of the pressure sensor positioned in the receiving opening. By evaluating this pressure data in the context of a control device for the volume flow, the volume flow through the attachment element from the static mixer to the filler material destination, such as the gap in the housing of the battery module, may ultimately be controlled and/or regulated. With the aid of the attachment element, reliable monitoring of the volume flow through the attachment element is thus possible. For this purpose, a pressure sensor does not have to be built into the battery module itself, but a reusable pressure sensor may be positioned in the attachment element, for instance, only temporarily. By means of the attachment element, it is therefore possible to position the pressure sensor in the direct vicinity of the injection tip of the static mixer, which results in particularly low loss of information concerning current pressure data.

The attachment element is furthermore preferably made of plastic, for example, of polyamide. As a result, the attachment element as a component is designed to be particularly inexpensive and easy to manufacture in terms of expenditure. The attachment element may, for instance, be manufactured inexpensively in an injection molding process. Each time the static mixer is changed, the attachment element may be retained or also changed, wherein the pressure sensor does not have to be replaced, but may rather be plugged into a new attachment element, for example, and is thus reusable. With each change of the static mixer, however, the attachment element is preferably also replaced by a new less-used or unused static mixer. Since the pressure sensor only has to be re-plugged for this purpose, only minimal additional expenditure arises when filling or injecting the filler material into the desired filler material destination. Overall, the gap in the housing of the battery module may thus be filled with a thermal paste as the filler material in a particularly convenient manner. By means of the attachment element, particularly reliable filling of a filler material into a filler material destination is ultimately made possible.

The invention also includes configurations which result in additional advantages.

In a particularly advantageous configuration, it is provided that the attachment element comprises an elastic subelement. The subelement is designed to be elastically deformable at least under application of a force parallel to the longitudinal direction of the flow channel. The elastic subelement is made, for example, of an elastomer and thus of a soft plastic or a rubber-like plastic. Integrating the elastic subelement into the attachment element is based on the understanding that, when the static mixer with the attachment element is moved towards the injection opening and positioned there, for example, a certain downforce is established, such that a flow-tight connection between the attachment element and the housing of the battery module is established between the attachment element and the injection opening. This may then prevent the filler material from not being injected into the injection opening but instead escaping into an environment under normal conditions, in other words, under application of a usual force in this context to the attachment element and the injection opening. When the attachment element moves towards the injection opening, problems often arise concerning component tolerance compensation between the attachment element and the injection opening of the housing. It is therefore sensible to design the attachment element in such a way that it enables tolerance compensation for component tolerance that is perpendicular to the longitudinal direction of the flow channel. In this way, for example, compression in this longitudinal direction may be permitted via the elastic properties of the elastic subelement, such that it is possible for the static mixer with the attachment element to be attached onto the injection opening of the housing of the battery module in a quick and straightforward manner. Installation tolerance may therefore be compensated for. However, the elastic subelement does not serve to compensate for pressure tolerance during the injection procedure of the filler material. Hence, in order to be able to ensure an overall advantageous injection procedure of the filler material into the gap of the housing of the battery module, the attachment element must not be designed to be entirely static in the longitudinal direction of the flow channel, but must instead be designed to be elastic at least in this direction with the aid of the elastic subelement. Because of this, the downforce established as described above, exerted on the injection opening by the attachment element, may be compensated for, such that, for example, there is neither a strong vibration of the attachment element with the pressure sensor nor a deformation of the attachment element, which could damage the pressure sensor in the receiving opening or influence a shape of the attachment element in such a way that a negative effect on the volume flow of the filler material through the flow channel arises as a result. The attachment element may thus be formed of two dissimilar plastics, since at least the elastic subelement is elastically deformable. Ultimately, this enables tolerance compensation in an advantageous manner due to the described configuration of the attachment element when the static mixer with the attachment element moves towards the injection opening of the housing of the battery module.

An additional configuration provides that the elastic subelement is arranged between an inlet element comprising the inlet opening and the fastening unit and an outlet element comprising the outlet opening. The inlet element and the outlet element are each made of a rigid material. The subelement is thus not located at an edge area of the attachment element, but in the center of the longitudinal extent of the flow channel in the longitudinal direction, for example, in other words, related to the distance between the inlet opening and the outlet opening as a longitudinal extent. The inlet element and the outlet element are preferably made of the same material. Alternatively, the inlet element and the outlet element may be provided to each be made of different materials. A suitable rigid material for the inlet element and the outlet element is a plastic that is rigid under normal conditions, such as at room temperature, such as, for instance, polyamide or another thermoplastic. The elastic subelement is consequently made of a different material than the inlet element and/or the outlet element. Neither the injection nozzle in the area of the outlet element nor the area of the fastening unit in the area of the inlet element are thus influenced by the elastic subsection, such that tolerance compensation in the longitudinal direction of the flow channel does not affect either of the fastening unit or the injection nozzle of the attachment element. This always ensures an optimal volume flow of filler material through the flow channel of the attachment element.

Furthermore, it is provided according to one configuration that the inlet element comprises the receiving opening. The receiving opening in which the pressure sensor can be positioned is preferably arranged in the upper area of the attachment element, that is, in the vicinity of the inlet opening and the fastening element. Both the elastic subsection and the outlet element are preferably arranged in a preferred flow direction of the filler material below the inlet element with the receiving opening. This makes it possible for the pressure sensor, if positioned in the receiving opening, to be arranged as close as possible in the area of the point of inflow of the filler material from the static mixer into the attachment element, such that the loss of information due to a pressure sensor arranged far from the inlet opening is maintained as low as possible. The receiving opening is positioned in the inlet element in such a way that the filler material passes by the opening in the subsection of the channel wall in the event of a volumetric flow of the filler material through the flow channel. The receiving opening is therefore not located in the area of the fastening unit of the attachment element. This enables an advantageous combination of compensation of force application when attaching it onto the injection opening and pressure measurement independent of the filler material destination in one component, that is, in a single attachment element, such that this combination in particular enables reliable filling of the filler material into the filler material destination.

In an additional configuration, a diameter of the outlet element is provided to be designed to taper towards the outlet opening. An outer circumference of the outlet element thus decreases in the longitudinal direction of the flow channel. In particular, the outer circumference and the diameter decrease over a longitudinal extension of the entire attachment element between the inlet opening and the outlet opening. It is assumed herein that a diameter of the flow channel remains constant in the area of the entire flow channel. There is therefore no tapering on the inner circumference side, but preferably only tapering on the exterior side of at least the outlet element. Alternatively, the outlet element may be provided to have an injection nozzle having a constant exterior wall thickness across a specified length of the flow channel. In both configurations, it may be achieved that the outlet element with the outlet opening is designed to be particularly space-saving and, moreover, optimal introduction of at least the outlet element into the injection opening of the housing of the battery module is made possible.

The attachment system according to the invention has the attachment element described above, the static mixer, and a pressure sensor. The attachment element has a flow channel with an inlet opening and an outlet opening arranged opposite the inlet opening in a longitudinal direction of the flow channel and designed as an injection nozzle. Furthermore, the attachment element is fastened at an inlet side having the inlet opening by means of a fastening unit of the attachment element on top of an injection tip of the static mixer. Furthermore, the attachment element has a receiving opening extending from an exterior side of the attachment element to an opening in a subsection of a channel wall of the flow channel. The pressure sensor is arranged in the receiving opening. The pressure sensor is, for example, a piezoelectric sensor with a membrane, the pressure sensor being positioned in the receiving opening in such a way that this membrane of the pressure sensor is arranged in the opening of the subsection of the channel wall. The preferred configurations described in the context of the attachment element according to the invention and their advantages apply accordingly, if applicable, to the attachment system according to the invention.

In an advantageous configuration of the attachment system, the pressure sensor comprises a fastening element by means of which the pressure sensor is removably fastened in the receiving opening. The pressure sensor thus has a thread as a fastening element, for example, on an exterior wall of a housing of the pressure sensor. With the aid of the thread, the pressure sensor may be screwed into the receiving opening and screwed out of it again if the receiving opening is configured accordingly. This is possible, for example, if the receiving opening has walls which are also provided with a corresponding thread. Alternatively or additionally, the fastening element may be designed as a plug element, which may aid in plugging the pressure sensor into the receiving opening. Alternatively, it is possible that the pressure sensor is merely introduced into the receiving opening without actually fixing the pressure sensor in the receiving opening. Ultimately, it is achieved that the pressure sensor is not built into the attachment element in a fixed manner, but may rather be repeatedly introduced into or removed from any specimen of the attachment element as a flexible element of the attachment system. The pressure sensor can thus be used several times and over a long period of time, whereas the attachment element is replaced again and again, for example, due to lower durability of such an attachment element, typically every five, six, seven, eight, nine, ten, eleven, and/or twelve hours. The pressure sensor is thus particularly easy to re-plug, which enables the attachment system to be used conveniently.

According to an additional configuration of the attachment system, it is provided that the pressure sensor has a sensor unit positioned in the opening in the subsection of the channel wall. The sensor unit is designed to sense pressure data and to evaluate the sensed pressure data as volume flow data describing a volume flow through the flow channel. The sensor unit is designed, for example, as a piezoelectric membrane positioned in such a way that, when there is a flow of filler material through the flow channel, corresponding pressure data describing the filler material flow is sensed by the sensor unit. The pressure data is thus related to the volume flow and enables a quantitative description of the volume flow. For evaluating the pressure data to determine the volume flow data, a corresponding evaluation unit may be provided in the pressure sensor itself, for example. Alternatively or additionally, evaluating the pressure data may be provided in a control device of the attachment system, spatially separated from the pressure sensor. Ultimately, the pressure data may enable observing whether, for example, the gap between the housing with the cooling element of the battery module and the individual battery cells of the battery module is being filled with the thermal paste as the filler as desired. Conceivable complications, such as, for instance, overfilling the gap, may therefore be identified. With the aid of the pressure data, a current state of the filling of the filler material destination with the filler material can therefore be determined in a particularly easy and reliable fashion.

Furthermore, one configuration of the attachment system provides that the attachment system comprises a control device and a filler material reservoir coupled to the static mixer and filled with a specified filler material. The thermal paste for the battery module, for example, is suited as the filler material in the filler material reservoir. The filler material reservoir is designed, for example, as a cylindrical cartridge and/or as a standard application system, as is known in adhesive technology, which is coupled to the static mixer. A material outlet of the filler material reservoir is consequently coupled to a material inlet of the static mixer, such that the filler material may be introduced from the filler material reservoir into the attachment element through the injection tip of the static mixer.

The control device is designed to evaluate the volume flow data to generate a control signal. Furthermore, the control device is designed to control and/or regulate the volume flow of the specified filler material from the filler material reservoir through the static mixer and the attachment element according to the generated control signal. The pressure data sensed by the pressure sensor positioned in the area of the inlet element may thus ultimately enable control and/or regulation of the entire volume flow of filler material exiting at the outlet opening designed as an injection nozzle. This achieves that the cycle time when filling the gap in the housing of the battery module with the thermal paste is optimally utilized, since, for example, the volume flow of filler material may be set particularly high at the beginning of this cycle time and be reduced at the end. However, it may also be provided that a constant or approximately constant volume flow of filler material is directed through the injection opening, that is, injected into it. Particularly reliable, controlled filling of the gap of the housing of the battery module is consequently achieved.

Also, one configuration of the attachment system provides that the control device is designed to terminate the volume flow once a specified maximum pressure is sensed by means of the pressure sensor. It is therefore recognized in good time when the gap in the housing of the battery module is completely filled, such that the filling procedure may be terminated. The pressure during the filling process may thus be reliably controlled and observed both during filling and at the end of the filling process. In particular, the specified maximum pressure is typically four bars, for example. This ultimately enables an optimized filling process for introducing the thermal paste into the battery module, taking into account the filling conditions specified due to the filler material destination in the form of the specified maximum pressure.

To fill the gap between at least one battery cell of a battery module and a cooling element arranged on top of a housing of the battery module, the following steps of a filling method are carried out: initially, the attachment element is positioned on top of the injection tip of the static mixer by means of the fastening unit of the attachment element. The attachment element with the static mixer is then moved towards an injection opening of the housing of the battery module, wherein a tolerance compensation in a longitudinal direction of the flow channel of the attachment element is compensated for by means of an elastic subelement of the attachment element. After the static mixer with the attachment element is positioned at the injection opening or already before that, a pressure sensor is positioned in a receiving opening of the attachment element. In a next step, a control device of the attachment system starts a volume flow of filler material, which is, for example, a thermal paste, from a filler material reservoir through the static mixer into the attachment element and through the injection opening into the gap of the battery module as the filler material destination. The gap in the battery module is therefore filled with the filler material. During filling, pressure data is continuously sensed by means of the pressure sensor and is evaluated to give volume flow data describing a volume flow through the flow channel. Depending on the evaluated volume flow data, the control device generates a control signal according to which the volume flow of the specified filler material from the filler material reservoir through the static mixer and the attachment element into the gap between the battery module is controlled and/or regulated. Once a specified maximum pressure is sensed by means of the pressure sensor, the volume flow is either reduced, that is, controlled and/or regulated accordingly, or optionally terminated. Once this terminating occurs, the static mixer with the attachment element may be moved away from the injection opening again and, for example, moved to a next injection opening. The pressure sensor may either be moved out of the attachment element beforehand or remain in the receiving opening. The preferred configurations presented in the context of the attachment element according to the invention as well as the attachment system according to the invention and their advantages apply accordingly, if applicable, to the filling method described, in other words, the described method of filling a filler material destination with a filler material. For this reason, the corresponding configurations of the filling method are not described again herein.

The invention also includes the control device for the attachment system. The control device has a processor device adapted to carry out the filling method described above. For this purpose, the processor device may have at least one microprocessor, and/or at least one microcontroller, and/or at least one FPGA (field programmable gate array), and/or at least one DSP (digital signal processor). Furthermore, the processor device may have program code adapted to carry out the filling method described above when executed by the processor device. The program code may be stored in a data storage of the processor device.

The invention also comprises the combinations of the features of the described embodiments.

An exemplary embodiment of the invention is described hereinafter. For this purpose, the single FIGURE shows a cross-sectional view of an attachment system for filling a filler material into a battery module.

The exemplary embodiment explained hereinafter is a preferred embodiment of the invention. In the exemplary embodiment, the described components of the embodiment each represent individual features of the invention intended to be considered independently of one another, each also developing the invention independently of one another. Therefore, the disclosure is intended to comprise combinations of the features of the embodiment other than those depicted. Furthermore, the described embodiment may also be supplemented by further features of the previously described features of the invention.

BRIEF DESCRIPTION OF THE FIGURE

In the FIGURE, like reference numerals designate elements with the same function.

DETAILED DESCRIPTION

In the single FIGURE, an attachment system 10 is outlined in a cross-sectional view. The attachment system 10 comprises a static mixer 12, an attachment element 14, and a pressure sensor 16. Moreover, the attachment system 10 has a filler material reservoir 18 and a control device 20. The attachment system 10 is designed to be positioned on top of a battery module 22. The battery module 22 has at least one battery cell 24, a housing 26 surrounding the battery module 22, and a cooling element in the form of a heat conducting plate 28. The heat conducting plate 28 may be a cooling base. A gap 30 is located between the heat conducting plate 28 and the at least one battery cell 24. The attachment element 14 of the attachment system 10 is intended to be arranged on the battery module 22 in the area of an injection opening 32 of the battery module 22. For this purpose, it has been automatically or manually moved to the injection opening 32 by means of a corresponding positioning device (not outlined in the FIGURE) and then introduced into the injection opening 32 with a tip of the attachment element 14. This serves to inject a filler material 34 from the filler material reservoir 18 through the static mixer 12 and the attachment element 14 via the injection opening 32 into the gap 30 of the battery module 22. The filler material 34 herein is a thermal paste 34. In the following, the term thermal paste 34 is used instead of the term filler material 34.

The attachment element 14 has numerous components. On the one hand, the attachment element 14 has a flow channel 40 bounded by a channel wall 41 extending overall from an inlet opening 42 to an outlet opening 44. A longitudinal extent of the flow channel 40 is oriented parallel to a longitudinal direction 46 of the flow channel 40 and stretches from the inlet opening 42 to the opposite outlet opening 44. The outlet opening 44 is designed as an injection nozzle. With the injection nozzle as the outlet opening 44, the attachment element 14 is ultimately introduced into the gap 30 through the injection opening 32. For this purpose, the attachment element 14 is shaped correspondingly in the area of the outlet opening 44 in an outlet element 64 of the attachment element. A subsection of this outlet element 64 arranged in the longitudinal direction 46 at the tip of the outlet element 64 may be designed to be heavily tapered compared to the remaining area of the outlet element 64. A diameter 70 in the area of an injection nozzle tip of the injection nozzle is consequently preferably smaller than a diameter 72 in an area of the outlet element 64 adjoining the injection nozzle tip.

The attachment element 14 also has a fastening unit 48 fastened in the area of an inlet side 50 having the inlet opening 42. With this fastening unit 48, the attachment element 14 may be fastened on top of an injection tip 52 of the static mixer 12. For this purpose, the fastening unit 48 either has a thread structure, and/or is designed as a plug element and/or a plug attachment. The fastening unit 48 is located in an inlet element 62 of the attachment element 14.

The attachment element 14 also has a receiving opening 54. The receiving opening 54 is designed such that the pressure sensor 16 may be positioned in this receiving opening 54. The pressure sensor 16 is herein removably fastened in the receiving opening 54, wherein the pressure sensor 16 comprises a fastening element 66 for this purpose. The fastening element 66 may be designed analogously to the fastening unit 48 in the form of a threaded spindle, in other words, with a threaded structure, and/or in the form of a plug element.

The receiving opening 54 extends from an exterior side 56 of the attachment element 14 to an opening 58 in a subsection of the channel wall 41 of the flow channel 40. The pressure sensor 16 is positioned within the receiving opening 54 in such a way that a sensor unit 68 of the pressure sensor 16 is positioned in the opening 58 of the subsection of the channel wall 41 and designed to sense pressure data. The sensed pressure data may then be evaluated as volume flow data describing a volume flow through the flow channel 40. This may be accomplished by means of an evaluation unit of the pressure sensor 16 and/or by means of the control device 20 of the attachment system 10.

The attachment element 14 also has an elastic subelement 60. This elastic subelement 60 is designed to be elastically deformable at least under application of a force parallel to the longitudinal direction 46. While the static mixer 12 with the attachment element 14 is being attached onto the injection opening 32, tolerance compensation in the longitudinal direction 46 may be compensated for in this process of moving towards the battery module 22 by means of the elastic subelement 60.

The inlet element 62 and the outlet element 64 are made of a different material than the elastic subelement 60, specifically of a rigid material, for example, a hard plastic such as polyamide. The elastic subelement 60 is formed, for example, of an elastomer and/or of a rubber-like plastic.

The receiving opening 54 for the pressure sensor 16 is arranged in the inlet element 62. The opening 58 is in this case located on the flow channel 40 in such a way that, when there is a volume flow of the thermal paste 34 through the flow channel 40, the sensor unit 68 of the pressure sensor 16 is passed by the thermal paste 34.

The control device 20 is designed to evaluate the volume flow data determined from the pressure data of the pressure sensor 16 in such a way that a control signal is generated. According to the generated control signal, the volume flow of the thermal paste 34 as the filler material 34 from the filler material reservoir 18 through the static mixer 12 and the attachment element 14 of the static mixer 12 is then controlled and/or regulated. Once the specified maximum pressure of typically four bars is sensed by means of the pressure sensor 16, the control device 20 is designed to interrupt, decrease, or terminate the volume flow of the thermal paste 34, that is, to at least vary the filling of the gap 30 of the battery module 22. For this purpose, corresponding signals are transmitted from the pressure sensor 16 to the control device 20, and corresponding data, such as the control signal, is transmitted from the control device 20 to a corresponding volume flow adjustment device 74 of the filler material reservoir 18. These signals may be transmitted in a wireless or wired fashion, for example, that is, the pressure data and/or the volume flow data is transmitted in a wireless or wired fashion from the pressure sensor 16 to the control device 20, and the control signal is forwarded in a wireless or wired fashion from the control device 20 to the volume flow adjustment device 74. The volume flow adjustment device 74 may be comprised by the attachment system 10. The attachment system 10 or the filler material reservoir 18 may also comprise the positioning device by means of which the attachment system 10 may be moved towards the injection opening 32 of the battery module 22 and lowered there.

As an alternative to the static mixer 12 outlined herein, a static mixer 12 with a conical configuration may be provided in the area of the injection tip 52. Depending on the shape of the static mixer 12, that is, depending on the configuration of the injection tip 52, the fastening unit 48 of the attachment element 14 is designed accordingly. Overall, both the static mixer 12 and the attachment element 14 are preferably designed to be cylindrical or cylinders tapering in the longitudinal direction 46.

Overall, the example shows a nozzle as the attachment element 14 for tolerance compensation and for receiving the pressure sensor 16. At the end of the static mixer 12 in the direction of the longitudinal direction 46, an additional component in the form of the attachment element 14 is affixed for this purpose. This component, that is, the attachment element 14, has two functions: on the one hand, a pressure sensor 16 can be installed thereon and, on the other hand, possible compression in the longitudinal direction 46 when moving towards the injection opening 32 of the battery module 22 becomes elastically possible. The attachment element 14 is formed of plastic and may therefore be manufactured inexpensively. Each time the static mixer 12 is changed, the pressure sensor 16 may be removed and a new attachment element 14 may be inserted. The big advantage is that both functions described may herein be integrated into one component. The plastic part, that is, the attachment element 14, is manufactured inexpensively in the injection molding mode. With each mixer change, the additional plastic part in the form of the attachment element 14 is also replaced. Only the pressure sensor 16 has to be re-plugged, specifically into a new attachment element 14 positioned on top of a new static mixer 12, for example. In other words, there will only be minimal additional expenditure arising therefrom. Such a change may take place, for example, once per shift, that is, for example, every six, seven, or eight hours. The attachment element 14 is attached onto a static mixer outlet side of the static mixer 12, that is, in the area of the injection tip 52 of the static mixer 12. It is formed from two dissimilar plastics. An upper part is constructed of a hard material and is referred to herein as the inlet member 62. This inlet element 62 serves to enable a sealed connection to the static mixer 12 and to receive the pressure sensor 16. A lower part is made of a soft, elastic plastic, specifically in the form of the elastic subelement 60. This elastic subelement 60 assumes the function of tolerance compensation in the longitudinal direction 46 while moving towards the battery module 22.

The invention claimed is:

1. An attachment element for a static mixer, comprising:
   a flow channel with an inlet opening, and
   an outlet opening arranged opposite the inlet opening in a longitudinal direction of the flow channel and designed as an injection nozzle;
   wherein the attachment element is designed to be fastened at an inlet side having the inlet opening by a fastening unit of the attachment element on top of an injection tip of the static mixer;
   wherein the attachment element has a receiving opening for a pressure sensor extending from an exterior side of the attachment element to an opening in a subsection of a channel wall of the flow channel; and
   wherein the attachment element further comprises an elastic sub-element elastically deformable at least under application of a force parallel to the longitudinal direction of the flow channel.

2. The attachment element according to claim 1, wherein the elastic sub-element is arranged between an inlet element comprising the inlet opening and the fastening unit and an outlet element comprising the outlet opening, wherein the inlet element and the outlet element are made of a rigid material.

3. The attachment element according to claim 2, wherein the inlet element comprises the receiving opening.

4. The attachment element according to claim 2, wherein a diameter of the outlet element is designed to taper towards the outlet opening.

5. The attachment element according to claim 3, wherein a diameter of the outlet element is designed to taper towards the outlet opening.

6. An attachment system comprising a static mixer, an attachment element, and a pressure sensor, wherein the attachment element:
   has a flow channel with an inlet opening and an outlet opening arranged opposite the inlet opening in a longitudinal direction of the flow channel and designed as an injection nozzle;
   is fastened at an inlet side having the inlet opening by a fastening unit on top of an injection tip of the static mixer;
   has a receiving opening extending from an exterior side of the attachment element to an opening in a subsection of a channel wall of the flow channel and in which the pressure sensor is arranged; and
   has an elastic sub-element elastically deformable at least under application of a force parallel to the longitudinal direction of the flow channel.

7. The attachment system according to claim 6, wherein the pressure sensor comprises a fastening element by which the pressure sensor is removably fastened in the receiving opening.

8. The attachment system according to claim 6, wherein the pressure sensor has a sensor unit positioned in the opening in the subsection of the channel wall and designed to sense pressure data and to evaluate the sensed pressure data as volume flow data describing a volume flow through the flow channel.

9. The attachment system according to claim 8, wherein the attachment system comprises a control device and a filler material reservoir coupled to the static mixer and filled with a specified filler material, and the control device is designed to evaluate the volume flow data to generate a control signal and to control and/or regulate the volume flow of the specified filler material from the filler material reservoir through the static mixer and the attachment element according to the generated control signal.

10. The attachment system according to claim 9, wherein the control device is designed to terminate the volume flow once a specified maximum pressure is sensed by the pressure sensor.

11. The attachment system according to claim 7, wherein the pressure sensor has a sensor unit positioned in the opening in the subsection of the channel wall and designed to sense pressure data and to evaluate the sensed pressure data as volume flow data describing a volume flow through the flow channel.

* * * * *